United States Patent
Rothman et al.

(10) Patent No.: US 7,134,125 B2
(45) Date of Patent: Nov. 7, 2006

(54) METHOD FOR FIRMWARE TO PROVIDE SEAMLESS REGULATION OF SYSTEM RESOURCES AND EXTEND ADDITIONAL CONFIGURATION METHODS FOR SYSTEM RESOURCE MANAGEMENT

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 10/360,445

(22) Filed: Feb. 7, 2003

(65) Prior Publication Data

US 2004/0158840 A1    Aug. 12, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................... 719/321; 719/104

(58) Field of Classification Search ............ 718/1, 718/100–108; 719/310–330
See application file for complete search history.

(56) References Cited

U.S. PATENT DOCUMENTS

| | | | |
|---|---|---|---|
| 5,826,082 A * | 10/1998 | Bishop et al. | 718/104 |
| 6,009,275 A * | 12/1999 | DeKoning et al. | 710/220 |
| 6,338,072 B1 * | 1/2002 | Durand et al. | 707/205 |
| 6,363,434 B1 * | 3/2002 | Eytchison | 719/313 |
| 6,385,638 B1 * | 5/2002 | Baker-Harvey | 718/107 |
| 6,654,780 B1 * | 11/2003 | Eilert et al. | 718/104 |
| 6,859,926 B1 * | 2/2005 | Brenner et al. | 718/100 |
| 2003/0041088 A1 * | 2/2003 | Wilson et al. | 709/104 |

* cited by examiner

*Primary Examiner*—William Thomson
*Assistant Examiner*—Diem Cao
(74) *Attorney, Agent, or Firm*—Blakely, Sokoloff, Taylor & Zafman LLP

(57) ABSTRACT

A method of system resource management. The method including: determining a class of a device agent and determining whether the device agent is requesting a controlled system resource or a non-controlled system resource. If a controlled system resource is requested by the device agent, then the method further includes determining whether a first amount of the controlled system resource requested by the device agent plus a second amount of the controlled system resource currently consumed by the class of the device agent, if any, together exceed a class allocation amount for the controlled system resource that is permissible for the class of the device agent to consume.

28 Claims, 5 Drawing Sheets

| Classification | NVRAM | System RAM | Resource X |
| --- | --- | --- | --- |
| Motherboard Device | Up to 70% | Up to 10% | 15MB |
| Add-in Devices (e.g., RAID Controller, NIC, USB Mouse) | Up to 20% | Up to 20% | 15MB |
| Other Devices (e.g., Operating System) | Up to 10% | Up to 70% | 96MB |
| Class X | 0% | 2% | 2MB |

FIG. 2

METHOD FOR FIRMWARE TO PROVIDE SEAMLESS REGULATION OF SYSTEM RESOURCES AND EXTEND ADDITIONAL CONFIGURATION METHODS FOR SYSTEM RESOURCE MANAGEMENT

TECHNICAL FIELD

This disclosure relates generally to computer system resource management, and in particular but not exclusively, relates to computer system resource management integrated into firmware.

BACKGROUND INFORMATION

When computer systems boot up today, there are a plurality of entities contending for a variety of system resources. Some of these entities include basic input output system ("BIOS") routines, device drivers for add-in devices (e.g., video card driver, network interface card driver, hard disk driver, CD-ROM driver, etc.), an operating system ("OS"), and the like. All of these entities are vying for finite system resources such as non-volatile random access memory ("NVRAM"), system random access memory ("RAM"), disk space, central processor unit ("CPU") runtime, and the like.

To date, there is no mechanism to prevent a rogue entity from consuming all of any one these system resources. Once a rogue entity has consumed all of a particular system resource, entities downstream (later in time) will no longer have access to the consumed system resource. Such an occurrence can lead to overall system instability issues or simply prevent a desired device driver from operating.

These rogue entities may be maliciously programmed entities such as computer viruses, which the programmer intends to cause denial-of-service attacks against the system. A denial-of-service attack may lead to instability of the system and ultimately to a system crash. Alternatively, these rogue entities may be poorly programmed and poorly tested device drivers which are "hogging" one or more system resources. A poorly programmed device driver could be the result of an errant software allocation strategy of system resources. Or, a rogue entity may simply be a corrupted or otherwise malfunctioning device driver.

Resource-poor systems are particularly vulnerable to rogue entities. Resource-poor systems are economy computer systems which ship with limited system resources. For example, a resource-poor system may have a relatively small amount of system RAM, a relatively slow CPU, and/or limited non-volatile ("NV") memory (e.g., read only memory ("ROM"), programmable read only memory ("PROM"), erasable programmable read only memory ("EPROM"), flash memory, disk drives, or tape drives). Because these economy computer systems ship with limited resources, an inefficiently programmed device driver could easily consume an unreasonable amount of any one of these system resources resulting in system instability.

Present systems have inadequate mechanisms, if any, to prevent rogue entities from consuming an unreasonable amount of system resources. Manufacturers of economy systems currently cannot ship these systems without worries of the adverse affect add-in devices may have on system stability and performance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 illustrates an embodiment of a resource configuration ("RC") matrix for correlating a system resource with a class allocation amount in accordance with the teachings of the present invention.

DETAILED DESCRIPTION

Figure 1:
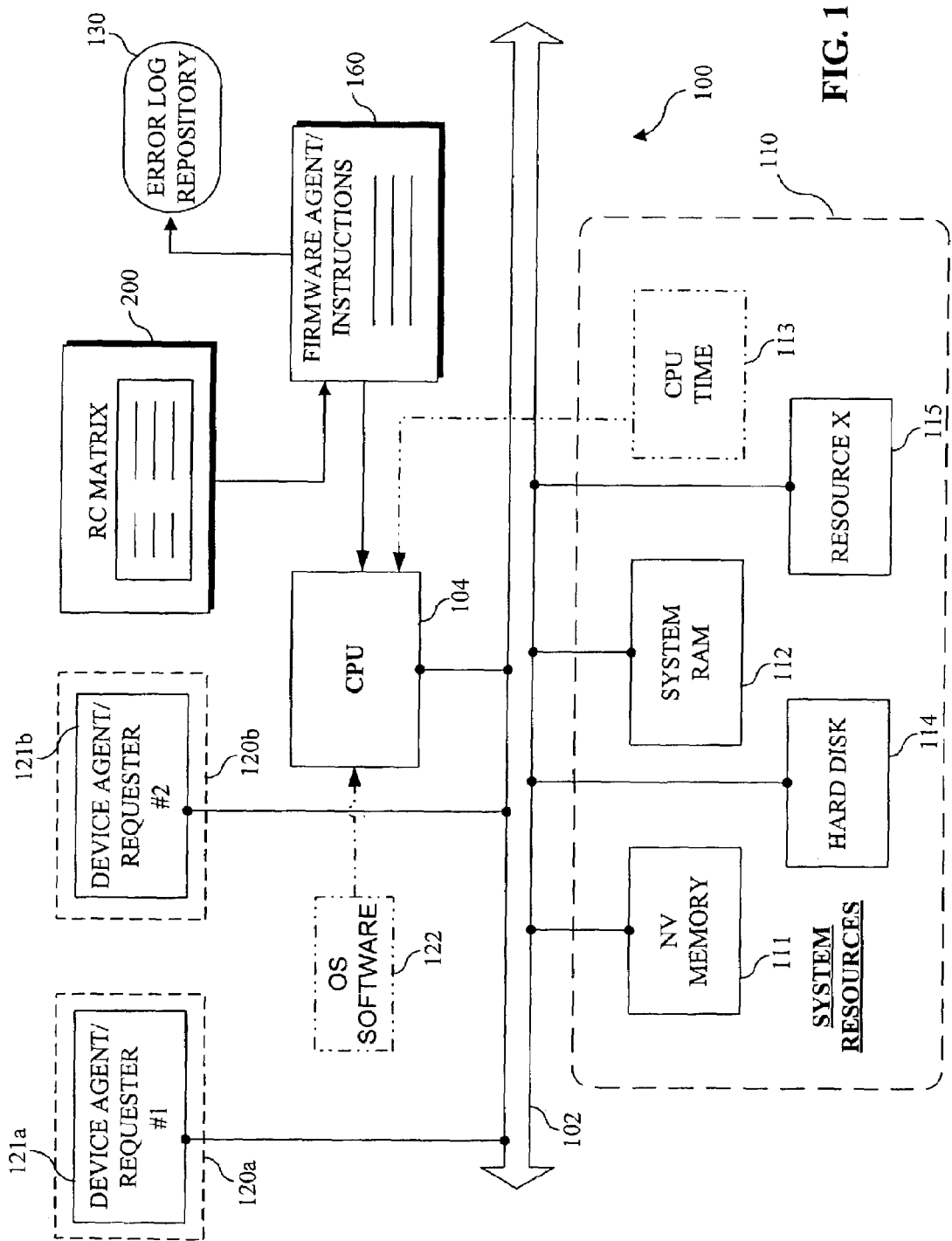
FIG. 1 illustrates an embodiment of a processing system to implement seamless system resource management in accordance with the teachings of the present invention.

Embodiments of a system and method providing seamless system resource management via firmware are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Random access memory" ("RAM") is defined to mean any memory device in a processing system where an operating system, application programs, or data in current use are held, but which looses its content/data once electrical power is turned off. "Firmware" is defined as program code which is held in any memory device capable of holding its content/data without electrical power and which is usually only read from, though it may or may not be capable of periodic writing to or updating. Firmware generally includes program code stored on non-volatile ("NV") memory including, but not limited to: read only memory ("ROM"), programmable read only memory ("PROM"), erasable programmable read only memory ("EPROM"), electrically erasable programmable read only memory ("EEPROM"), various types of flash memory, and the like. "NV memory"

is defined as any memory device capable of retaining its content/data without need of electrical power and includes ROM, PROM, EPROM, EEPROM, disk drives, tape drives, and the like. NV memory also includes volatile memory (i.e., memory which looses its content/data without electrical power) connected to a reliable power source (e.g., battery) independent from the power source of the system in which the NVRAM is used.

Embodiments of a method and system that allow firmware to seamlessly regulate the usage of system resources are described herein. Embodiments of the present invention selectively limit access to various system resources by device agents, such as device drivers of add-in devices or an operating system ("OS") in a computer. Selectively limiting access to system resources ensures that system critical device drivers/applications have access to finite system resources. This selectively limited access can be accomplished by providing a configurable input that correlates system resources with class allocation amounts. A class allocation amount can vary depending upon the class to which a device agent is assigned.

FIG. 1 illustrates a processing system 100 to implement seamless system resource management, according to an embodiment of the present invention. In this embodiment, processing system 100 includes a central processing unit ("CPU") 104, a system bus 102, a system resources 110, devices 120a and 120b having corresponding device agents/requesters 121a and 121b (henceforth "device agent 121a" and "device agent 121b," respectively), an error log repository 130, a resource configuration ("RC") matrix 200, a firmware agent/instructions 160 (henceforth "firmware agent 160"), and OS software 122. This embodiment of system resources 110 includes NV memory 111, system RAM 112, CPU runtime 113, a hard disk 114, and resource X 115. Resource X is a symbolic placeholder for "other" system resources 110 and illustrates that embodiments of processing system 100 may include any number and types of other system resources not depicted.

In the depicted embodiment, the elements of processing system 100 are interconnected as follows. CPU 104 is communicatively coupled to system bus 102. Many of the system resources 110 are also communicatively coupled to system bus 102, including NV memory 111, system RAM 112, hard disk 114, and resource X 115. Additionally, devices 120a and 120b are communicatively coupled to system bus 102. System bus 102 can be an electrical bus to transmit electrical impulses representing data or an optical waveguide bus to transmit light impulses representing data. In one embodiment, system bus 102 is a data bus. In another embodiment, system bus 102 is a control bus. In yet another embodiment, system bus 102 is an address bus. In other embodiments, system bus 102 represents all of the above or any combination thereof. Several elements generally used to enable CPU 104 and system resources 110 to communicate over system bus 102 have been omitted from FIG. 1 for the sake of clarity. Two such omitted elements include a control hub and an input/output hub.

In one embodiment, OS software 122 includes program code stored on hard disk 114 and executed by CPU 104. OS software 122 represents an all-encompassing bridge between the hardware elements depicted in FIG. 1 and software run on them or stored in them. OS software 122 includes many drivers necessary to access and use system resources 110. In general, OS software 122 may include any operating system compatible with CPU 104, examples of which include but are not limited to Microsoft Windows (e.g., Windows 95, 98, ME, NT or 2000), MS-DOS, OS/2, UNIX-based OS systems, LINUX, and the like.

In one embodiment, devices 120a and 120b are add-in devices coupled to system bus 102 so that they may communicate with system resources 110, CPU 104, and/or OS software 122. Although two devices are depicted, it should be appreciated that any number of devices may be coupled to system bus 102. Examples of an add-in device include peripheral component interconnect ("PCI") devices, universal serial bus ("USB") devices, a redundant array of independent disks ("RAID") controller, and the like.

In one embodiment, device agents 121a and 121b include program code (e.g., software or firmware drivers) to control the operation of devices 120a and 120b, respectively. In one embodiment, device agents 121a and 121b are stored on memory devices located within their respective devices 120a and 120b. In one embodiment, device agents 121a and 121b are stored on one or more of hard disk 114, NV memory 111, and system RAM 112. In yet another embodiment, portions of device agents 121a and 121b may be located on their respective memory devices within devices 120a and 120b and other portions located on one or more of hard disk 114, NV memory 111, and system RAM 112.

CPU 104 acts to coordinate communications over system bus 102 between the various elements coupled thereto. For example, CPU 104 can retrieve program code stored on hard disk 114, which in turn causes CPU 104 to stimulate device agent 121a, which controls device 120a, to transfer data from device 120a into system RAM 112. When device 120a transfers data into RAM 112 at the direction of its device agent 121a, device agent 121a is said to use or "consume" a portion of system RAM 112. If left unchecked, it is possible for device agent 121a to consume all available system RAM 112, such that there is no memory space available for other system entities, such as device agent 121b or OS software 122.

Devices 120a and 120b each individually or together may be capable of consuming all of anyone or more of system resources 110, thus denying other system elements of the consumed system resource 110. Similarly, OS software 122 may be capable of consuming system resources 110. Consumption of system resources 110 alone is not undesirable, in fact it is necessary for processing system 100 to function. However, it is undesirable when system resources 110 are "unreasonably consumed" by one or more of devices 120a and 120b or OS software 122. The definition of unreasonable may change from platform to platform or even from one application of a platform to another application. Embodiments of the present invention allow a user or a manufacturer of processing system 100 to define upper boundaries for "reasonable consumption." Thus, if for example, device agent 121a were to consume more than a defined reasonable amount of a particular system resource 110, its consumption would be deemed unreasonable. In one embodiment, unreasonable consumption of any particular system resource 110 is based upon a ratio (i.e., percentage) of the total particular system resource 110. In an alternative embodiment, unreasonable consumption is based upon a fixed amount of any particular system resource 110.

FIG. 2 illustrates an embodiment of a RC matrix 200, in accordance with the teachings of the present invention. RC matrix 200 correlates system resources 210 with classes 220 and their corresponding class allocation amounts 230. Class allocation amounts 230 represent the user defined or manufacturer defined upper boundaries for reasonable consumption. In one embodiment, RC matrix 200 is software code stored on a memory device communicatively coupled to CPU 104, such a hard disk 114, system RAM 112, and/or NV memory 111. In an alternative embodiment, program code describing RC matrix 200 is firmware.

The user or manufacturer of processing system 100 can create any number of classes 220 which define or group devices in any desirable manner; for illustrative purposes only four classes 220 are depicted in FIG. 2. Similarly, FIG. 2 illustrates only three system resources 210 for clarity. However, embodiments of RC matrix 200 may include respective columns for any number of system resources 210. Similarly, the illustrated class allocation amounts 230 are merely representative amounts. While allocation amounts 230 under the NV memory column are depicted as percentages of the total NV memory 111, embodiments of RC matrix 200 may use fixed amounts of memory as class allocation amounts 230 for NVRAM. Thus, embodiments of RC matrix 200 can include ratios or fixed amounts of whatever the particle system resource 210 may be for the corresponding class allocation amounts 230. It should be appreciated that any number of classes 220 may be correlated with any number of system resources 210 and that any combination of fixed sums or ratios may be used to describe class allocation amounts 230.

In one embodiment, classes 220 can each represent a single device or a group of devices. For example, in the embodiment illustrated the class "Add-in Devices" includes several devices, such as for example, a RAID controller, a network interface card ("NIC"), and a USB mouse. Alternatively, a class can be assigned to a single device, such as the motherboard device listed. In one embodiment, classes 220 can be modified or updated by the user and/or manufacturer of processing system 100 at anytime.

Returning to FIG. 1, in one embodiment firmware agent 160 is firmware stored in NV memory 111 and coupled to be executed by CPU 104. In one embodiment, firmware agent 160 is a code segment within basic input output system ("BIOS") chips of processing system 100 (not shown). When processing system 100 is powered-on a process called the power-on-self-test ("POST") check begins with an electrical signal following a permanently programmed path to CPU 104. This causes CPU 104 to look to a specific address in one of the BIOS chips that contains the beginning of a boot program. The BIOS boot program in turn invokes a series of system checks, which collectively comprise the POST check. During these system checks CPU 104 sends signals over system bus 102 to the various components of processing system 100 including system resources 110 and devices 120*a* and 120*b*. Once the various components of processing system 100 have been verified, the boot process continues to the next step—loading OS software 122 from hard disk 114 to system RAM 112.

During this boot process, device agents 121*a* and 121*b* may already begin consuming system resources 110, such as for example NV memory 111 or system RAM 112. As stated above, it may be necessary and even desirable for device agents 121*a* and 121*b* to consume a reasonable amount of system resources 110 at this early stage. However, if device agents 121*a* and 121*b* individually or in combination consume an unreasonable amount of system resources 110, processing system 100 may become unstable or even lockup. Thus, firmware agent 160 is employed as a gatekeeper of system resources 110 to monitor the consumption of selected system resources 110, and if necessary, deny or limit one or more of device agents 121*a* and 121*b* and even OS software 122, access to the selected system resources 110. The selected system resources 110 that are monitored by firmware agent 160 are called controlled system resources. Those system resources 110 which are not monitored by firmware agent 160 are non-controlled system resources.

Figure 3:
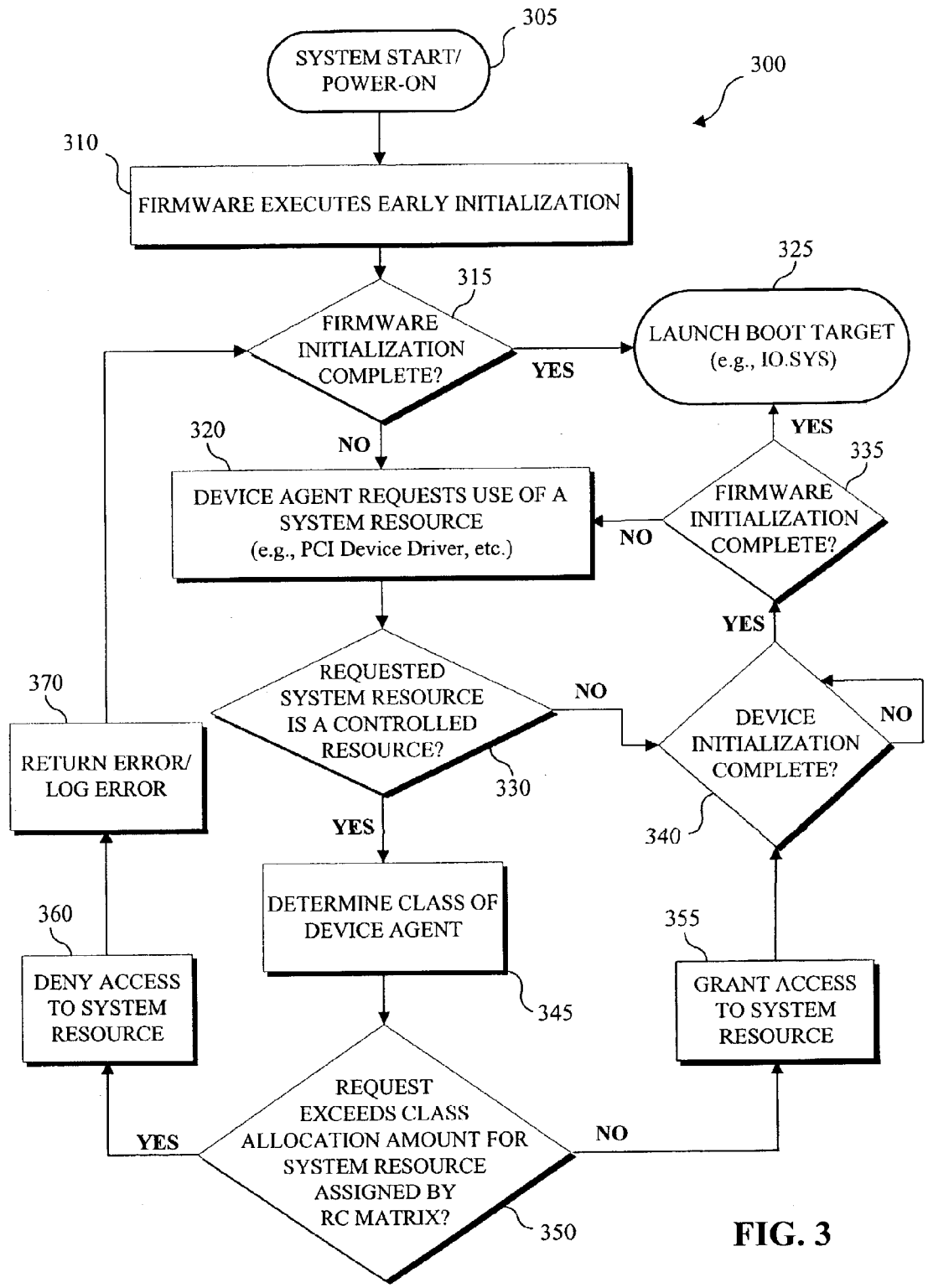
FIG. 3 illustrates a method for firmware to implement an embodiment of seamless system resource management in accordance with the teachings of the present invention.

FIG. 3 illustrates one embodiment of a system resource management process 300, in accordance with the present invention. One embodiment of processing system 100 operates as follows to implement seamless system resource management. System resource management process 300 is termed "seamless" because it is user transparent (i.e., implemented without need of user participation).

System resource management process 300 begins in process block 305 wherein processing system 100 is powered-on. In response, firmware (e.g., code stored on the BIOS chips) is executed to perform early initialization of processing system 100, as depicted by process block 310. This early initialization includes the POST check described above.

In decision block 315, the firmware determines whether or not the initialization process is complete. If the initialization process is complete, then the boot target is launched (e.g., IO.SYS) so that OS software 122 is loaded into system RAM 112.

However, firmware initialization of processing system 100 may not be complete for any number of reasons. One such reason may be because device agents 121*a* and 121*b* have not yet initialized devices 120*a* and 120*b*. In an example of device agent 121*a* initializing, device agent 121*a* may need to consume a portion of one or more system resources 110. In process block 320, device agent 121*a* requests permission from firmware agent 160 to consume a specified amount of system resources 110. For example, device agent 121*a* may request to consume an amount of NV memory 111, which is equal to 10% of the total global amount of NV memory 111.

In decision block 330, firmware agent 160 checks RC matrix 200 to determine whether or not NV memory 111 (the requested system resource) is a controlled system resource or a non-controlled system resources. In one embodiment, controlled system resources are system resources 210 listed in RC matrix 210. In one embodiment, non-controlled system resources are system resources 110, which are not listed in RC matrix 210. A system resource 110 may not be a controlled system resource either because firmware does not have the ability to control it (i.e., limit or block access to the particular system resource 110) or which the manufacturer or user of processing system 100 has decide not to selectively limit consumption by device agents 120*a* and 120*b* or OS software 122.

In an alternative embodiment of system resource management process 300, decision block 330 is skipped. In this alternative embodiment, decision block 330 may be skipped because all system resources 110 are the controlled system resources. If all system resources 110 are the controlled system resources, firmware agent 160 need not determine whether a controlled or a non-controlled system resource is requested. Decision block 330 may also be skipped when all system resources 110 over which firmware agent 160 has control are the controlled system resources. Thus, once again firmware agent 160 can simple assume a request for system resources 110 is a request for a controlled system resource.

Referring to the illustrated embodiment of RC matrix 200 (FIG. 2), NV memory 111 is listed as one of system resources 210 in RC matrix 200 and, in this example, is therefore a controlled system resource. In process block 345, firmware agent 160 determines the classification of device agent 121*a*. If device agent 121*a* is, for example, a software driver for a USB mouse, device agent 121*a* would fall under the class "add-in devices" of classes 220 listed in RC matrix 200. Firmware agent 160 is capable of determining the identity of a requester for system resources 210 based upon the address of the requesting device agent. During early initialization of processing system 100 (process block 310) a memory map is created which contains memory allocations for the various entities of processing system 100, including device agents 121a and 121b and OS software 122. By comparing the address of a requesting device agent against addresses in the known memory map, firmware agent 160 is capable of determining the identity of the requesting device agent and thus the particular class 220 under which the requesting device agent should fall. In the example where device agent 121a is the USB mouse driver, firmware agent 160 would determine that device agent 121a falls under the "add-in devices" class 220 of RC matrix 200.

In decision block 350, firmware agent 160 determines whether class allocation amount 230 would be exceeded if access to the requested system resource 210 were granted. This determination is based upon the particular class allocation amount 230 corresponding to the particular class 220 of the requesting device agent. In the illustrated embodiment, the "add-in devices" class 220 of RC matrix 200 has a class allocation amount of up to 20% of the total global amount of NV memory 111. In the present example, device agent 121a is attempting to use 10% of NV memory 111. Assuming no other entity of processing system 100 falling under the "add-in devices" class 220 has consumed more than 10% of NV memory 111, firmware agent 160 would grant device agent 121a access to 10% of NV memory 111 (process block 355).

Next, system resource management process 300 would continue to decision block 340 to wait while device agent 121a finishes it initialization. Then, in decision block 335 firmware agent would either launch the boot target (process block 325) if the firmware initialization is complete or return to process block 320 to wait for another request from a device agent.

Continuing the above example, suppose device 120b is a NIC card requesting 15% of NV memory 111. In this example, device agent 121b also falls under the "add-in devices" classification of classes 220. System resource management process 300 follows the same set of process blocks from process block 320 until decision block 350 is reached, as described above. In decision block 350, firmware agent 160 determines, whether or not the request by device agent 121b would exceed the corresponding class allocation amount 230 (in this example up to 20%) for the add-in devices class 220. Because device agent 121a has already consumed 10% of NV memory 111, the request by device agent 121b for an additional 15% exceeds the corresponding class allocation amount 230. Thus, in one embodiment firmware agent 160 denies device agent 121b access to NV memory 111 in process block 360.

In an alternative embodiment, firmware agent 160 grants device agent 121b access to an amount of NV memory 111, which does not exceed its corresponding class allocation amount 230. In this case, process block 360 is replaced with granting access to an available amount of the requested system resource 210. In this alternative embodiment example, firmware agent 160 would grant device agent 121b access to only 10% of NV memory 111.

In process block 370, if the request for a system resource 210 exceeds the corresponding class allocation amount 230, in one embodiment firmware agent 160 generates an error signal. In one embodiment, the error signal is sent to the requesting device agent (e.g., device agent 121b). In one embodiment, the error signal is stored as an error message in error log repository 130. Using error log repository 130 allows the user of processing system 100 to determine which device agent 121a or 121b is acting as a rogue entity. In one embodiment, the error signal is broadcast live over a network to a server or administrator in charge of maintaining computers on the network. Embodiments of the present invention further include providing the error message in real-time to the user of processing system 100 or include any combination of the above embodiments.

Providing feedback in the form of the error signal or error message enables the user to pinpoint the source of a problem quickly and without a costly system diagnosis by a trained technician. For instance, when the user connects a misbehaving add-in device to processing system 100, it can cause unpredictable behavior in other entities/aspects of processing system 100 and may cause the user to believe there is something errant with processing system 100—not the misbehaving add-in device. Blocking the misbehaving add-in device itself from erroneously allocating an improperly sized resource allocation may cause the add-in device to fail, but will allow firmware agent 160 to notify the user who the "culprit" might be and advantageously address the issue with the vendor of the add-in device, not the vendor of processing system 100.

Following generation of the error signal in process block 360, system resource management process 300 returns to decision block 315. System resource management process 300 continues from decision block 315 as described above.

Returning to decision block 330, if the requested system resource is a non-controlled system resource, firmware agent 160 will wait until the requesting device agent has completed initializing itself (decision block 340) and then determine whether the overall firmware initialization is complete (decision block 335). If the firmware initialization is not complete, system resource management process 300 returns to process block 320 to wait for another device agent to request use of one or more of system resources 110. If the firmware initialization is complete, firmware agent 160 launches the boot target file (e.g., IO.SYS), which begins loading OS software 122.

The above examples used NV memory 111 to describe how embodiments of system resource management process 300 are implemented. A specific example includes space-constraints in flash memory of a desktop computer system. Such flash memory may only have 5 Kbytes available for general storage. With the advent of standards such as the Extensible Firmware Interface ("EFI"), some subset of the flash memory is exposed as variable storage for an Operating System Vendor's ("OSV") policy agent. During the boot process and OS runtime, firmware agent 160 provides the needed mechanism to prevent device agents from starving the OSV's storage requirement.

As mentioned above, firmware agent 160 may act as a gatekeeper to system resources 110, other than just NV memory 111. In fact, embodiments of firmware agent 160 can apportion CPU runtime 113 among classes 220. Additionally, firmware agent 160 can allocate space on hard disk 114 among classes 220. Particular examples of space allocation on hard disk 114 include allocation of an Extensible Firmware Interface ("EFI") system partition and allocation of a Host Protected Area ("HPA") of ATA-5.

Embodiments of firmware agent 160 are not limited to managing system resources 110 prior to loading OS software 122. In one embodiment, firmware agent 160 manages system resources 110 through an entire power cycle of processing system 100 including during a pre-OS software 122 load time, during OS software 122 loading, and during post OS software 122 loading (i.e., OS runtime).

Figure 4:
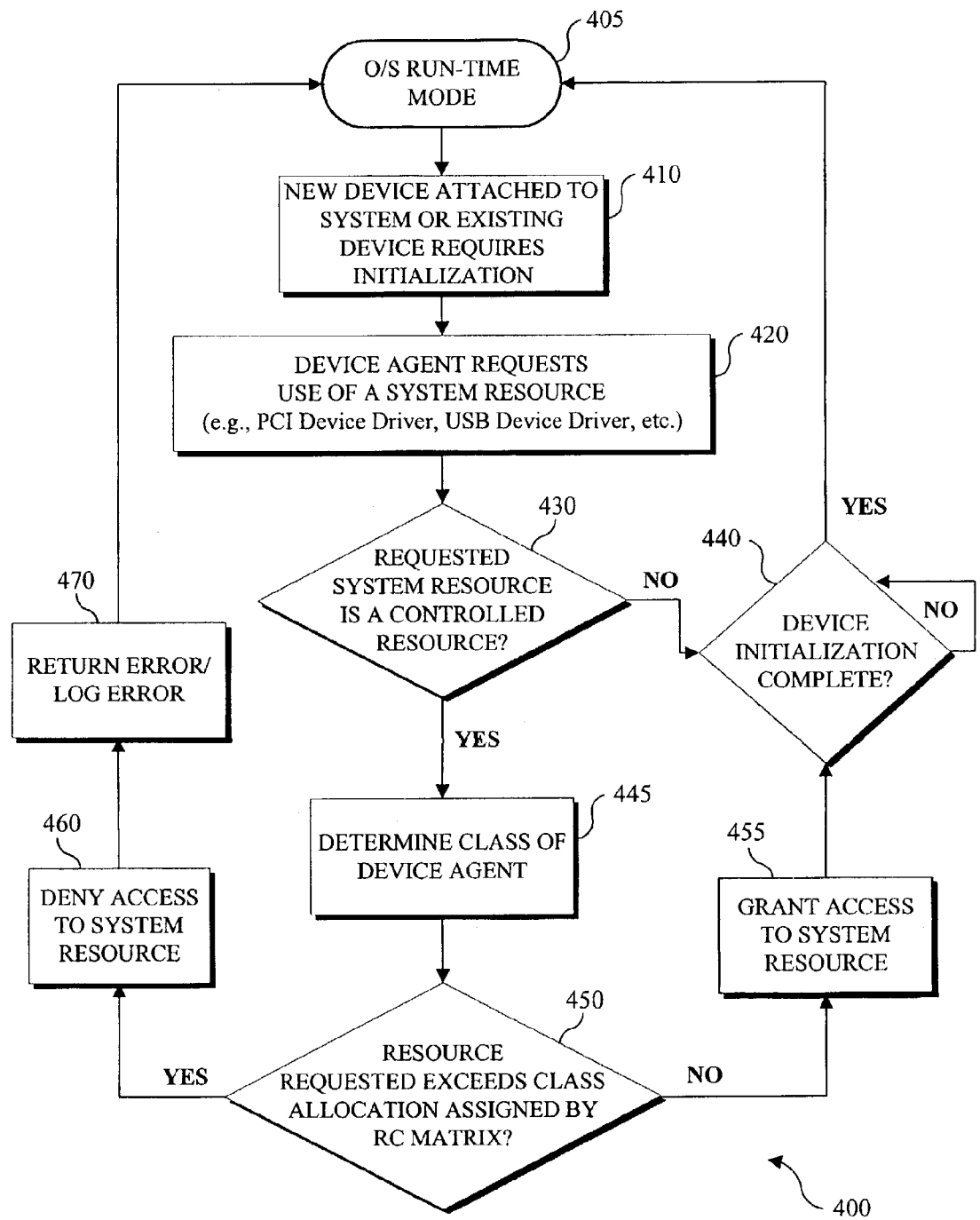
FIG. 4 illustrates a method for firmware to implement an embodiment of seamless system resource management in accordance with the teachings of the present invention.

FIG. 4 illustrates one embodiment of a system resource management process 400, in accordance with the present invention. One embodiment of processing system 100 operates as follows to implement seamless system resource management during OS runtime. Embodiments of system resource management process 400 are similar to embodiments of system resource management process 300, except in the manners discussed below.

In process block 405, firmware has handed control over the system boot process to OS software 122 and OS software 122 is currently managing processing system 100. However, even though OS software 122 is currently managing processing 100, access to many of system resources 110 are abstracted through an interface of firmware agent 160. Thus, firmware agent 160 can still act as the gatekeeper to many or all of system resources 110 (e.g., NV memory 111).

In process block 410, either a new device is communicatively coupled to system bus 102 (e.g., USB plug-and-play device, "hot-swap" capable device, or the like) or an existing device (e.g., devices 120a or 120b) is reset or otherwise requires initialization. It should be appreciated that OS software 122 may contain a number of device agents (i.e, OS drivers) which may also require initialization during OS runtime in response to any number of events or conditions.

In process block 420 a device agent (e.g., device agent 120a) requests use of one or more of system resources 110. In decision block 430, firmware agent 160 determines whether or not the particular system resource 110 requested is a controlled system resource (e.g., system resources 210) or a non-controlled system resource. If a non-controlled system resource is requested, system resource management process 400 continues to decision block 440 and waits until the requesting device agent completes its initialization and then returns to process block 405. If a controlled system resource is requested, firmware agent 160 determines the corresponding class 220 (process block 445).

In decision block 450, firmware agent 160 determines whether or not class allocation amount 230 would be exceeded if access to the requested controlled system resource were granted. Access is granted (process block 455) if the amount requested plus an amount already consumed by the class of the requester, if any, does not exceed the corresponding class allocation amount 230. In one embodiment, access is denied (process block 460) if the amount requested plus the amount already consumed by the class of the requester, if any, exceeds the corresponding class allocation amount 230. If a request would exceed the corresponding class allocation amount 230, an error signal/message may be generated, displayed, logged, or broadcast (process block 470) as described above in connection with system resource management process 300.

In an alternative embodiment, if the amount of the requested controlled system resource plus the amount of the controlled system resource already consumed by the requester's class exceeds the corresponding class allocation amount 230, firmware agent 160 grants access to only so much of the requested controlled system resource that will not exceed the corresponding class allocation amount 230. In this case, process block 460 is replaced with granting access to an available amount of the requested controlled system resource. In some applications, this alternative embodiment may be less desirable then the first embodiment because rogue entities are still able to "hog" a particular system resource 210, up to the corresponding class allocation amount 230 to the exclusion of other device agents within the same class 220. However, the user of processing system 100 may still be notified of the engorged request for the particular system resource 210 via an error message (process block 470).

If the request for the particular controlled system resource plus the amount of the particular controlled system resource already consumed by the requester's class 220 does not exceed the corresponding class allocation amount 230, firmware agent 160 grants access to the particular controlled system resource and waits until the requesting device completes initialization (decision block 440). Next, system resource management process 400 returns to process block 405.

Figure 5:
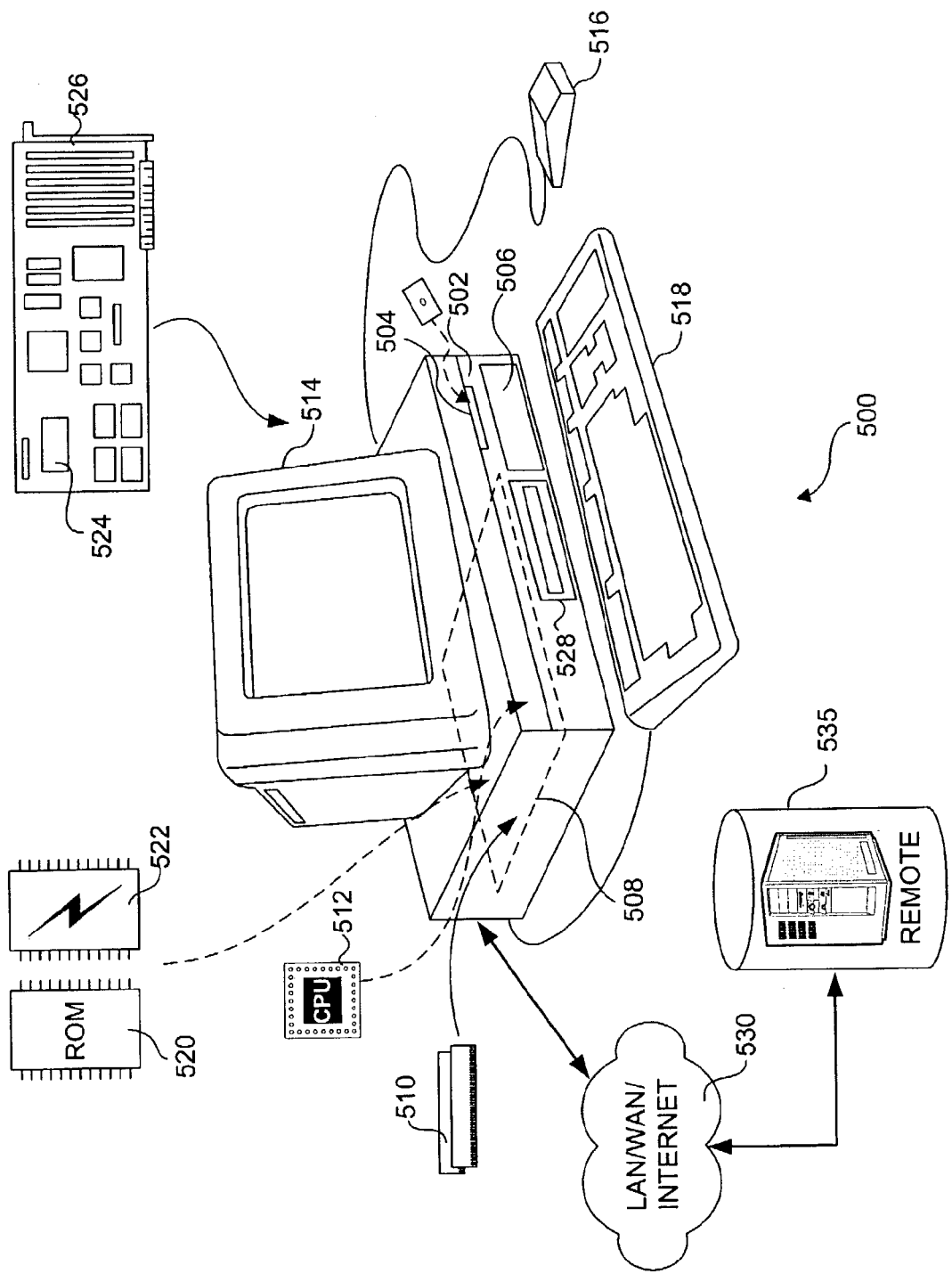
FIG. 5 illustrates an embodiment of an exemplary computer system for practicing seamless system resource management in firmware in accordance with the teachings of the present invention.

FIG. 5 illustrates an embodiment of an exemplary computer system 500 for practicing system resource management processes 300 and 400, in accordance with the teachings of the present invention. Computer system 500 includes a processor chassis 502, a monitor 514, a mouse 516 (or other pointing device), and a keyboard 518. The illustrated embodiment of chassis 502 further includes a floppy disk drive 504, a hard disk 506, an add-in card 526, a power supply (not shown), and a motherboard 508 populated with appropriate integrated circuits including system RAM 510, non-volatile memory 520 and/or 522, and one or more CPUs 512.

In one embodiment, add-in card 526 is coupled to an expansion slot (not shown) of motherboard 508. In one embodiment, add-in card 526 is device 120a (or device 120b) and maybe for example, a video card, a NIC card, or the like.

Hard disk 506 may comprise a single unit, or multiple units, and may optionally reside outside of computer system 500. Monitor 514 is included for displaying graphics and text generated by software programs and program modules that are run by computer system 500. Mouse 516 (or other pointing device) may be connected to a serial port, USB port, or other like bus port communicatively coupled to CPU(s) 512. Keyboard 518 is communicatively coupled to motherboard 508 in a similar manner as mouse 516 for user entry of text and commands. In one embodiment, computer system 500 also includes a NIC (not shown) for connecting computer system 500 to a computer network 530, such as a local area network, wide area network, or the Internet. In one embodiment network 530 is further coupled to a remote computer 535, such that computer system 500 and remote computer 535 can communicate.

In one embodiment, firmware agent 160 is stored in non-volatile memory 520 and/or 522. In one embodiment, a portion of firmware agent 160 may be loaded from a NV memory device 524 of add-in card 526. In one embodiment, NV memory device 524 may contain an updated class allocation amount 230 for RC matrix 200.

Computer system 500 may also optionally include a compact disk-read only memory ("CD-ROM") drive 528 into which a CD-ROM disk may be inserted so that executable files and data on the disk can be read or transfer into system RAM 510 and/or hard disk 506. Other mass memory storage devices may be included in computer system 500.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A machine-readable medium having instructions embodied thereon, the instructions to be executed by a machine to perform:
determining a class of a device agent requesting to use a first amount of a system resource of a processing system;
determining via a firmware agent whether the first amount of the system resource requested by the device agent plus a second amount of the system resource currently consumed by the class, if any, together exceed a class allocation amount of the system resource that is permissible for the class of the device agent to consume; and
controlling access to the system resource via the firmware agent during a pre-boot runtime of the processing system, wherein controlling access includes granting the device agent access to the system resource if the first amount plus the second amount do not exceed the class allocation amount.

2. The machine-readable medium of claim 1, wherein controlling access further includes denying the device agent access to the system resource if the first amount plus the second amount exceed the class allocation amount.

3. The machine-readable medium of claim 1 wherein the system resource is non-volatile memory.

4. The machine-readable medium of claim 1 wherein determining whether the first amount of the system resource requested by the device agent exceeds a class allocation amount includes referring to a resource configuration ("RC") matrix correlating the system resource with the class allocation amount for the class of the device agent.

5. The machine-readable medium of claim 4 wherein the class allocation amount of the system resource comprises a ratio of the system resource.

6. The machine-readable medium of claim 1, further comprising:
executing the agent during the pre-boot runtime and during an operating system ("OS") runtime of the processing system; and
controlling access to the system resource via the agent during the OS runtime.

7. A method of system resource management, comprising:
determining a class of a device agent;
determining whether a controlled system resource of a processing system or a non-controlled system resource of the processing system is requested by the device agent;
if a controlled system resource is requested, then determining whether a first amount of the controlled system resource requested by the device agent plus a second amount of the controlled system resource currently consumed by the class, if any, together exceed a class allocation amount for the controlled system resource that is permissible for the class of the device agent to consume; and
controlling access to the controlled system resource via a firmware agent during a pre-boot runtime of the processing system, wherein the controlled system resource comprises any resource over which the firmware agent has control, and wherein controlling access includes granting the device agent access to the controlled system resource if the first amount plus the second amount do not exceed the class allocation amount.

8. The method of claim 7, wherein controlling access to the controlled system resource comprises:
denying the device agent access to the requested controlled system resource, if the first amount plus the second amount, if any, of the controlled system resource together exceed the class allocation amount.

9. The method of claim 8, further comprising:
returning an error message to the device agent, if the device agent is denied access to the requested controlled system resource.

10. The method of claim 8, further comprising:
storing an error message in an error log repository, if the device agent is denied access to the requested controlled system resource.

11. The method of claim 7, wherein controlling access to the controlled system resource comprises:
granting the device agent access to only an unconsumed amount of the controlled system resource permissible for the class of the device agent to consume, if the first amount plus the second amount, if any, of the controlled system resource together exceed the class allocation amount.

12. The method of claim 7, further comprising:
granting access to the non-controlled system resource, if a non-controlled system resource is requested by the device agent.

13. The method of claim 7 wherein the controlled system resource comprises non-volatile memory.

14. The method of claim 7 wherein the class allocation amount comprises a ratio of a total available amount of the controlled system resource.

15. The method of claim 7 wherein the class allocation amount comprises a fixed amount of the controlled system resource.

16. The method of claim 7 further comprising:
executing the agent during the pre-boot runtime and during an operating system ("OS") runtime of the processing system; and
controlling access to the controlled system resource via the agent during the OS runtime.

17. A processing system, comprising:
a firmware memory device to store instructions therein; and
a central processing unit ("CPU") coupled to receive the instructions from the firmware memory device, the instructions to selectively limit access to a system resource controllable by the instructions when executed by the CPU during a pre-boot runtime of the processing systems,
wherein the firmware instructions selectively limit access to the system resource by determining a class of a requester for the system resource and associating the class with a class allocation amount for the system resource,
wherein selectively limiting access to the system resource includes granting access to the system resource if the first amount plus the second amount do not exceed the class allocation amount.

18. The processing system of claim 17, wherein the instructions include a resource configuration ("RC") matrix to correlate the class allocation amount of the class with the system resource.

19. The processing system of claim 17, further comprising a resource configuration ("RC") matrix to correlate the class allocation amount of the class with the system resource, the RC matrix stored on another memory device communicatively coupled to the CPU.

20. The processing system of claim 17 wherein the instructions selectively limit access to the system resource by denying access to the system resource when a request to use the system resource by the requester would exceed the class allocation amount for the class of the requester.

21. The processing system of claim 17 wherein the class allocation amount comprises a ratio of the system resource.

22. The processing system of claim 17 wherein the class allocation amount comprises a fixed amount of the system resource.

23. The processing system of claim 17 wherein the requester comprises an attached device communicatively coupled to the CPU and the system resource via a data bus to send and to receive data over the data bus and to use the system resource.

24. The processing system of claim 23 wherein the attached device comprises an add-in device.

25. The processing system of claim 17 wherein the requester comprises a operating system software running on the processing system.

26. The processing system of claim 17 wherein the system resource comprises non-volatile memory.

27. The processing system of claim 17 wherein the system resource comprises system random access memory.

28. The processing system of claim 17, wherein the instructions are also executable by the CPU during an operating system ("OS") runtime of the processing system to selectively limit access to the system resource during the OS runtime.

* * * * *